Figure 1:
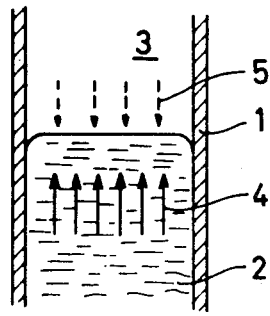

United States Patent [19]
Van Andel

[11] 3,713,288
[45] Jan. 30, 1973

[54] ENERGY CONVERTER

[75] Inventor: Eleonoor Van Andel, Twekkelo, Netherlands

[73] Assignee: European Atomic Energy Community (Eurstom)

[22] Filed: July 8, 1970

[21] Appl. No.: 53,160

[30] Foreign Application Priority Data

July 21, 1969 Germany.................P 19 37 645.5

[52] U.S. Cl. ........................60/25, 3/1, 128/1.1
[51] Int. Cl. ..................................F03g 7/06
[58] Field of Search........128/1 R, 1.1; 3/1; 60/23, 25; 92/98 R

[56] References Cited

UNITED STATES PATENTS

| | | | |
|---|---|---|---|
| 2,241,620 | 5/1941 | Shoeld | 60/25 |
| 3,132,472 | 5/1964 | Schweitzer | 60/23 |
| 3,285,001 | 11/1966 | Turnblade | 60/25 |
| 3,379,191 | 4/1968 | Harvey | 3/1 |
| 3,563,028 | 2/1971 | Goranson et al. | 3/1 |

FOREIGN PATENTS OR APPLICATIONS 772,753  4/1957  Great Britain..........................60/24

*Primary Examiner*—Samuel Feinberg
*Attorney*—Stevens, Davis, Miller and Mosher

[57] ABSTRACT

Thermo-mechanical energy converter which can be used as an artificial heart. The converter comprises a plutonium heat source, a plurality of parallel tubes open at one end to a diaphragm chamber and heated at the other end, an evaporable liquid filling completely the chamber and partially each tube, and a piston in each tube, all pistons being interconnected for synchronizing the evaporation-condensation cycles which are performed at the closed ends of the tubes. This converter produces directly from a temperature difference mechanical oscillation in a closed loop.

5 Claims, 3 Drawing Figures

PATENTED JAN 30 1973 3,713,288

ENERGY CONVERTER

The invention relates to an energy converter adapted to derive a mechanical oscillation from a heat source and a heat sink, in particular an energy converter of the aforementioned kind which is suitable as an artificial heart for implantation in living organisms.

It is known that radio isotopes, implanted in the body can be employed as energy sources for artificial hearts. The plutonium isotope 238, whose disintegration energy comprises mainly alpha radiation of short range and whose half life is sufficiently long for lifetime implantation can be used as such a source. A source of this kind may for example be operated at temperatures of approximately 300°C.

The problem with which the invention is concerned relates to the conversion of the aforementioned thermal energy into a mechanical output which is preferably an oscillating pump output for use as an artificial heart. The Rankine cycle, which in practical technological terms requires a steam engine, a boiler, a condenser and a pump, represents a conventional process for converting thermal energy into mechanical energy. Since apparatus of this kind incorporates many moving parts and is a heavy assembly it follows that the steam engine does not represent a satisfactory solution to the problem of application as an artificial heart. In all probability a system of such kind would have to be operated under trouble-free and maintenance-free conditions for at least 10 years because a major surgical operation is required to replace such system.

The present invention achieves an improvement in this respect. The energy converter according to the invention is based on a physical principle which was hitherto put into practice only in technological fringe areas. It is known that an oscillation is obtained if an upright tube, tightly closed at the top, open at the bottom, and partially filled with an evaporable fluid, is exposed to a wide temperature gradient along said tube in such a way that the temperature at the upper end is above the evaporation temperature of the fluid. Starting from a position in the cycle of oscillations in which the meniscus is rising, the colder fluid will tend to rise; the vapor disposed in the closed upper part of the tube will therefore condense and the vapor pressure will diminish thus causing the meniscus to be drawn up still further.

When the meniscus has risen to the extent that the fluid temperature has risen to the evaporation temperature the vapor pressure will once again rise and the meniscus is therefore thrust downwardly. This process is accompanied by part of the fluid adhering to the wall and evaporating thereon at high speed owing to the increased wall temperature. Accordingly, the pressure in the vapor chamber increases still further and accelerates the meniscus in its downward motion until a position is reached at which the wall temperature of the tube is so low as to cause the vapor to condense whereupon the motion is reversed and the meniscus once again rises.

Hitherto this physical principle was used for propulsion of toy boats in which a candle heats the upper end of a small tube the open end of which is immersed in the water. This principle is suitable as an energy converter for a pump which replaces or assists the human heart because it does not involve any mechanically moving parts, because it is simple and therefore trouble-free and because the oscillation can be employed directly for the blood circulation if suitable valves are used.

The direct application of the above mentioned physical principle for energy conversion on a substantial scale is not possible because the energy obtained from one tube is very small. However, if several tubes are operated in parallel it will give rise to the problem of synchronization as it would not otherwise be possible for the total energy to be tapped off.

The present invention, which seeks to reduce this problem, provides an energy converter for producing a mechanical oscillation by virtue of a temperature difference and comprising a plurality of parallel tubes each open at one end to a diaphragm chamber and closed at the other end, an evaporable liquid within the chamber and partially filling each tube, means for creating a temperature difference along the tubes such that the closed end of each tube is hotter than the remainder of the tube and sufficient to effect vaporization of the liquid and a plurality of pistons, one in each tube, said pistons fitting loosely in the tubes and being mechanically coupled together for reciprocation in synchronism.

Another problem relates to the effect of gravitational force. The principle referred to above could hitherto be performed only with tubes, closed at the top and being positioned upright or at an angle since under these conditions the gravitational force will assist the descent of the meniscus. The effect of gravitational force will be the greater, the larger the diameter of the tube, a feature which would normally be desirable in order to increase the pump output. However, if a plurality of thin tubes is employed in accordance with the invention, the internal diameter of said tubes being so small that the effect of gravitational force is negligible by comparison with the surface tension it will also be possible for the energy converter to operate in a gravitational free space or even to be inverted. Freedom from the effects of gravity is one of the conditions for successful implantation into human beings.

The pistons may extend with a substantial amount of slack into the tubes so that frictional effects and fitting problems are negligible. Each piston will reciprocate at the rhythm of the oscillation prevailing in its tube and therefore transmit to the other piston a pulse which prevents individual tubes varying their phase or period relative to the greater proportion of the tubes.

Figure 2:
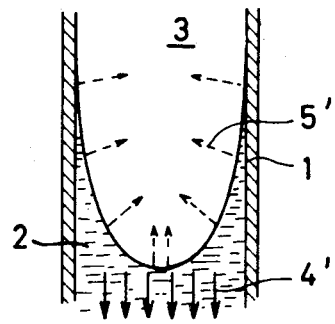
Figure 3:
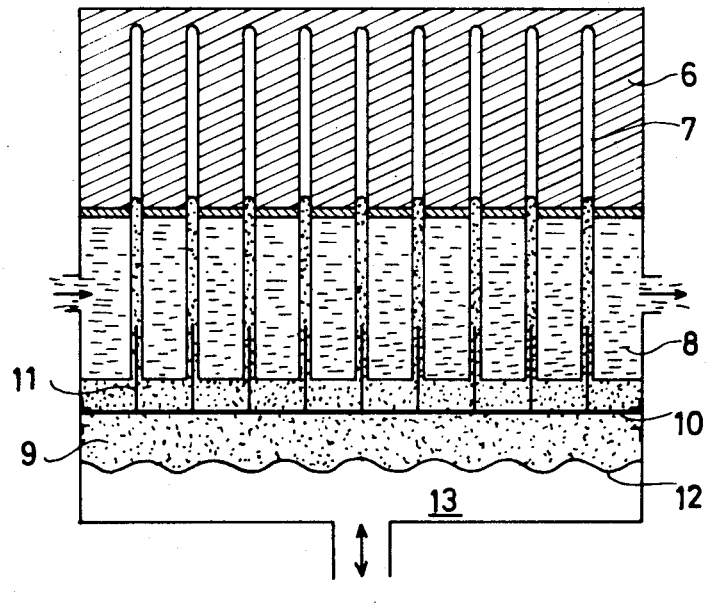

The invention will now be explained in more detail with reference to three illustrations of which FIGS. 1 and 2 are explanatory diagrams relating to the physical principle involved while FIG. 3 is a diagrammatic cross section through an energy converter according to the invention.

FIG. 1 and FIG. 2 show the two most important phases of an individual tube 1 in operation. The drawing in each case shows the tube section where the liquid 2 merges into the vapor chamber 3. In FIG. 1 the liquid level is in the process of rising due to vapor condensation, as symbolized by the arrows 4. The surface meniscus of the fluid is curved relative to the vapor chamber. The liquid, originating from the cooler zone, penetrates into the vapor chamber and cools the vapor until partial condensation takes place as symbolized by the arrows 5. The upward motion of the liquid is reduced to the extent to which the temperature of the liquid rises owing to contact with the hot wall of the vapor chamber. Finally, the motion is stopped because condensation (arrows 5) has ceased and fresh vapor is formed on the surface.

The motional process is then reversed, the meniscus is curved downwardly and the situation according to FIG. 2 is produced. The arrows 4' show the downward motion of the liquid the arrows 5' the generation of vapor on the surface which has now been enlarged. The evaporation effect is particularly large at the position at which the liquid film on the wall of the tube 1 is only very thin.

The downward motion of the meniscus is once again reduced as soon as it immerses into the cooled zone of the tube because the evaporation rate on the meniscus surface will then become zero and the liquid will cool to such an extent that vapor is condensed on its surface. This motion is reversed and the operating phase according to FIG. 1 is once again produced.

The energy converter forming the present example of the invention and operating in accordance with the principle mentioned hereinabove will now be described by reference to FIG. 3. The converter substantially comprises a heat source 6, for example a block of $PuO_2$ having a volume of 10 cm³. A plurality of thin tubes 7, the upper ends of which are rigidly and tightly closed, extend into the aforementioned block. The part of the tube which extends into the plutonium block therefore forms the heating zone while the part disposed therebelow is surrounded by a cooling medium 8 which may for example comprise the body blood of the patient or an auxiliary fluid brought to body temperature.

All tubes extend into a common diaphragm vessel 9 which is filled with a working liquid. The working liquid is so selected that it traverses an evaporation-condensation cycle in the temperature gradient under consideration.

The diaphragm vessel is provided with a grid frame 10, having a plurality of apertures and on which are mounted pin-shaped pistons 11 in alignment with each of the tubes. One of the pin-shaped pistons 11 therefore extends into each tube. The frame 10 is loosely fixed in the diaphragm vessel so that it can follow the oscillations with an appropriate amplitude and is therefore able to deliver synchronizing pulses to the individual tubes.

At the bottom, the diaphragm vessel is closed by a diaphragm 12 the motion of which transmits the oscillation energy to a working medium disposed in the pump chamber 13. When valves are used, such working medium may be the body blood of the patient.

The frequency of oscillation is defined by the viscosity of the working medium and the geometry of the pipes. An oscillation of 1 Hz was obtained in a laboratory test with a tube having an internal diameter of 6 mm, such frequency being ideally suited to the natural cardiac rhythm. Efficiencies in excess of 10 percent may be expected by thermal shielding of the energy source to the exterior and by the use of tube materials with a high thermal conductivity.

The solution proposed by the invention is suited for artificial hearts or for energy conversion in space stations in particular because it does not require any fitting parts, any through leads or lubrication, because it is very compact and because the working fluid remains in a closed vessel. A plutonium block as energy source is advisable owing to the short reach of the dangerous radiation (the weight of shielding may be neglected) and because of its long working life. When implanted into human beings it is however essential to ensure that the plutonium cannot emerge from the block under any possible circumstances in daily life (for example an automobile accident).

What we claim is:

1. An energy converter for producing a mechanical oscillation by virtue of a temperature difference and comprising a plurality of parallel tubes each open at one end to a diaphragm chamber and closed at the other end, an evaporable liquid within the chamber and partially filling each tube, means for creating a temperature difference along the tubes such that the closed end of each tube is hotter than the remainder of the tube and sufficient to effect vaporization of the liquid and a plurality of pistons, one in each tube, said pistons fitting loosely in the tubes and being mechanically coupled together for reciprocation in synchronism.

2. An energy converter as claimed in claim 1 in which a plutonium-bearing isotope is used as a heat source.

3. An energy converter as claimed in claim 1 in which the pulse energy energy is used to operate a diaphragm pump.

4. An energy converter as claimed in claim 1 when used as an artificial heart.

5. An energy converter as claimed in claim 4 in which a fluid at a temperature substantially equal to the body temperature of the patient is employed to cool the tubes.

* * * * *